(12) United States Patent
Amelkin

(10) Patent No.: US 12,545,517 B1
(45) Date of Patent: Feb. 10, 2026

(54) DYNAMIC ROBOT SCHEDULER

(71) Applicant: Amazon Technologies, Inc., Seattle, WA (US)

(72) Inventor: Viktor Amelkin, Merion Station, PA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 425 days.

(21) Appl. No.: 18/213,097

(22) Filed: Jun. 22, 2023

(51) Int. Cl.
  *B65G 1/137* (2006.01)
  *G05B 19/4155* (2006.01)

(52) U.S. Cl.
  CPC ....... *B65G 1/1375* (2013.01); *G05B 19/4155* (2013.01); *G05B 2219/40523* (2013.01)

(58) Field of Classification Search
  CPC .............. B65G 1/1375; G05B 19/4155; G05B 2219/40523
  See application file for complete search history.

(56) References Cited

U.S. PATENT DOCUMENTS

| 10,235,642 | B2* | 3/2019 | Kattepur | G05D 1/0217 |
|---|---|---|---|---|
| 11,597,082 | B2* | 3/2023 | Yi | G06Q 10/08 |
| 11,707,839 | B2* | 7/2023 | High | G05B 19/4189 |
| | | | | 700/216 |
| 11,866,260 | B2* | 1/2024 | Hatteland | B65G 1/1375 |
| 11,969,896 | B2* | 4/2024 | Liu | G06Q 10/047 |
| 12,124,261 | B2* | 10/2024 | Li | G05D 1/227 |
| 12,421,051 | B2* | 9/2025 | Hatteland | G06Q 10/08 |
| 2014/0100717 | A1* | 4/2014 | Yoneda | G05D 1/0289 |
| | | | | 701/2 |
| 2018/0075402 | A1* | 3/2018 | Stadie | G05B 19/41895 |

* cited by examiner

*Primary Examiner* — Kyle O Logan
(74) *Attorney, Agent, or Firm* — K&L Gates LLP

(57) ABSTRACT

In various examples, a first robot assigned to carry a first load may be determined. An estimated queuing time at a work station may be determined. A processing time associated with processing the first load at the work station may be determined. An arrival time for the first robot may be determined by: combining the estimated queuing time and the processing time to determine a total amount of time for the first robot; determining a first time period that is after an earliest arrival time and which is associated with available occupancy at the work station for at least the total amount of time; and determining the arrival time for the first robot as the beginning of the first time period. The first robot may be controlled to cause the first robot to arrive at the work station at the arrival time.

20 Claims, 9 Drawing Sheets

```
Algorithm 1 Single-station Greedy Scheduler
    Input:   candidate work pool $W = \{(w_i, A_i)\}, A_i$ – set of possible arrival times for work unit $w_i$
             earlier allocated work $W_a = \{(w_i, a_i)\}, a_i$ – arrival time estimate
             executed work trail $W_t = \{(w_i, \tilde{a}_i)\}, \tilde{a}_i$ – realized arrival time of executed work $w_i$
             target queue capacity $c_t$
             expected queueing virtual time estimate $t_q$ (empirical or theoretical)
    Output:  newly allocated work $W_{new} = \{(w_i, a_i)\}, a_i$ – chosen arrival time estimate
 1:  $W_{new} \leftarrow \emptyset$
 2:  $S \leftarrow$ empty schedule
 3:  $S \leftarrow$ add-trail-work$(S, W_t)$
 4:  $S \leftarrow$ add-allocated-work$(S, W_a)$
 5:  while $W \neq \emptyset$ do
 6:      $(w_c, A_c) \leftarrow$ pop-top-priority-work$(W)$
 7:      $T \leftarrow table(S)$                                              ▷ Algorithm 2
 8:      $space \leftarrow$ dwell-virtual-time$(w_c) + t_q$
 9:      $a_c \leftarrow$ find-best-entry-virtual-time$(T, space, c_t)$       ▷ mostly, Algorithm 3
10:      if $a_c \neq \emptyset$ then
11:          $S \leftarrow S + (w_c, a_c)$
12:          $W_{new} \leftarrow W_{new} \cup (w_c, a_c)$
13:      $O = \emptyset$                                                     ▷ overflow spots acted upon
14:      while $T$ has overflow w.r.t. $c_t$ at time not in $O$ do
15:          $t_o \leftarrow$ latest $T$ overflow time not in $O$
16:          $O \leftarrow O \cup t_o$
17:          $ov \leftarrow overflow(T, t_o)$
18:          $\{w_x\} \leftarrow$ up to $ov$ closest to the queue tail members of $W_{new}$ present in $T$ at time $t_o$
19:          if $\{w_x\} \neq \emptyset$ then
20:              $W_{new} \leftarrow W_{new} \setminus \{w_x\}$
21:              $S \leftarrow S - (\{w_x\})$
22:      $T \leftarrow table(S)$
23:  return $W_{new}$
```

FIG. 4

DYNAMIC ROBOT SCHEDULER

BACKGROUND

In a heterogeneous robotic processing facility, robotic drive systems can be used to move items and/or containers of items from one location to another. Robotic arms can be used to sort items by removing an item from one location and placing the item in a different, target location. Systems of such robots can be designed and deployed to accomplish a variety of tasks such as item retrieval, processing, and sortation.

BRIEF DESCRIPTION OF DRAWINGS

FIG. 3B depicts candidate drive robot work with dwell times augmented with mean queueing time estimate in accordance with various aspects of the present disclosure.

FIG. 3C depicts the augmented candidate drive robot work of FIG. 3B "packed" into the queue occupancy table of FIG. 3A, in accordance with various aspects of the present disclosure.

FIG. 3D depicts a realized version of the queue occupancy table of FIG. 3C based on robot drive station queue arrival times, in accordance with various aspects of the present disclosure.

FIG. 4 depicts a computer-implemented algorithm that may be used to schedule arrival times of drive robots at a work station, in accordance with various aspects of the present disclosure.

DETAILED DESCRIPTION

Figure 1:
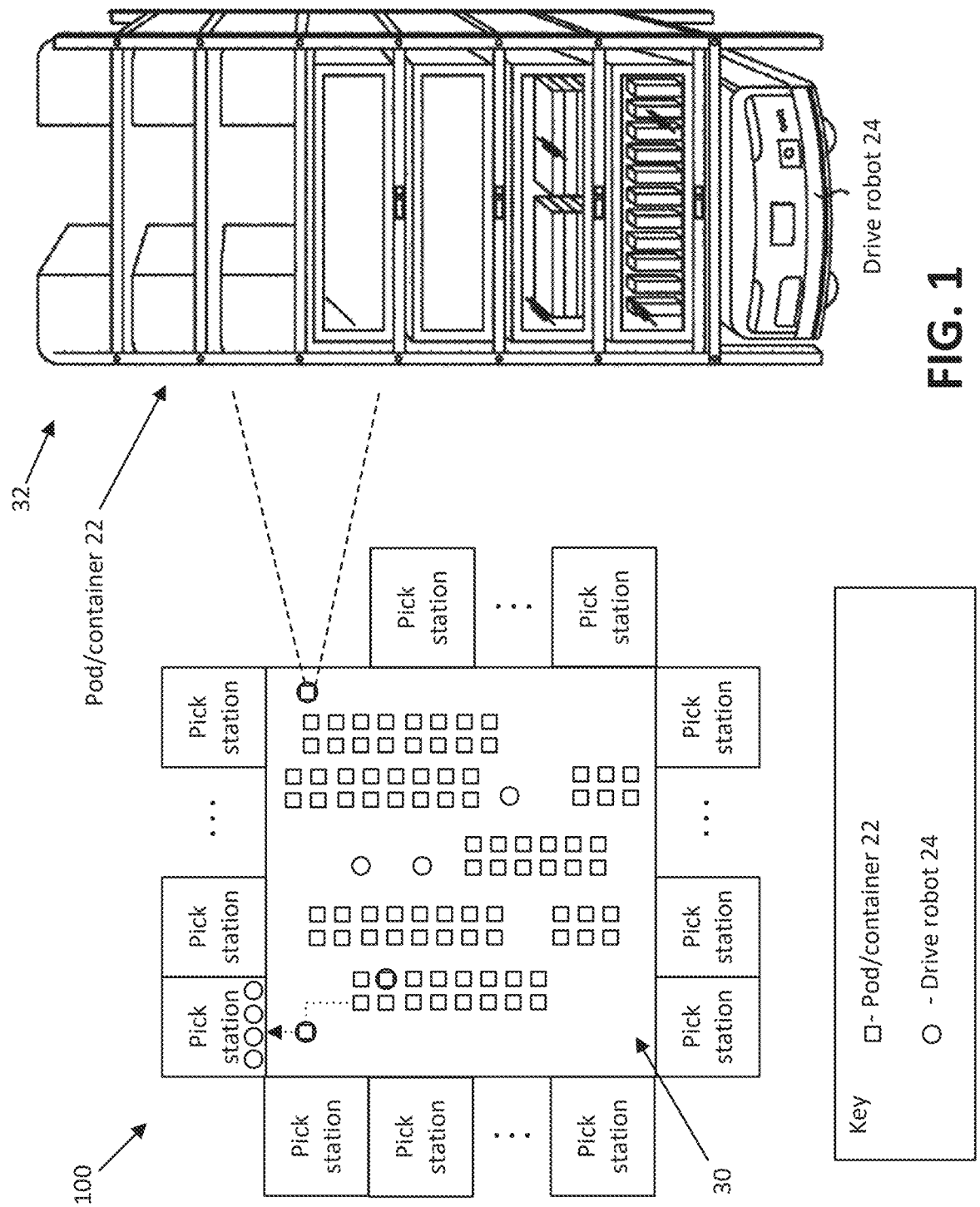
FIG. 1 is a diagram of an example overhead view of a robot-controlled storage field and pick stations, according to various aspects of the present disclosure.

In the following description, reference is made to the accompanying drawings that illustrate several example embodiments of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

In various examples, robotic picking and sortation systems may be used in large-scale inventory processing environments in which a large number of items are received, processed, sorted, and sent out. For example, large-scale delivery and inventory management systems may use fulfillment centers and other large warehouses that may serve as part of the supply chain and can serve as a hub for logistics and processes used to get items from third party sellers to the purchaser. In some cases, received items at a robotic fulfillment center may be placed in robot-controlled storage fields. For example, items may be stored in containers (sometimes referred to as "pods"). When an item is ordered and needs to be processed for shipment, instead of having a human worker find and walk to a storage shelf in a warehouse to "pick" the item, robotic drives may be controlled to select the pod (or other container) storing the item and may transport the pod to a pick station where a worker or another robot may pick the item from the pod and send the item for downstream processing. After items in such facilities are packaged and addressed for delivery, the packages may be sorted into carts and/or other containers, with the packages in a single container being destined for the same delivery location. Accordingly, in some examples, there may be a distinction between different robot-controlled operations in such facilities. A "picking" operation may refer to robots moving a pod from a robot-controlled storage field to a pick station and/or selection of the item at the pick station. A "sortation" operation may be downstream of the "picking" operation and may refer to sorting items and/or packages of items into carts or other containers that are bound for the same truck, freight unit, or other "destination." In some examples, such containers may be said to be "destination pure" as all items within the container may be destined for the same downstream location (whether such location is an intermediate location, such as a warehouse or last-mile delivery center, or the terminal location (e.g., a delivery address of a purchaser)). It should be noted that sortation may be used in other contexts beyond commercial delivery systems and in general may be used whenever heterogeneous items are to be sorted along some dimension of sortation (e.g., type, class, size, delivery destination, color, functionality, etc.). Accordingly, although many of the examples described herein use a package delivery example, the various dynamic allocation techniques used to control robotic resources may instead be deployed in other object-picking and/or sortation contexts.

In various robotic warehouses, inventory or packages are transported across robotic floors (e.g., areas designated for robot operation) by robotic drives. As previously described, in some examples drives carry pods (shelved units with inventory) from the floor's interior to the stations along the floor's perimeter for inventory picking, stowing, and other operations. To hedge against uncertainty in pod delivery times, stations use drive queues, and it is essential to ensure that these queues are not empty and, at the same time, not overflowing. Having an empty drive queue—or, alternatively, having a work gap-naturally leads to station underutilization. A queue overflowing to the extent of drives' blocking the queue exit or passage of drives to other stations, may lead to work gaps and/or even system lockup.

Upstream work planners may be software-based controllers operating upon large order backlogs to plan work in the absence of exact knowledge about material, pod, and drive locations on the robotic floor, as well as about the state of the stations and their drive queues. Such a planner passes station-level short work pools to downstream work allocators, and the latter plan the robotic execution. That is, the downstream work allocators determine which work (e.g., a pod delivery to a station) is allocated for execution first and at what time that execution (e.g., drive dispatch to a pod) needs to begin. Additionally, the downstream work allocators determine which drive performs the delivery. Described herein are schedulers (e.g., drive robot scheduler 150) that use the robotic drive-pod matching provided by downstream work allocators as candidates for robotic drive-pod-station work allocation.

The existing work allocators aim at keeping the queues busy and under capacity by favoring the fastest delivery of material to the stations and, simultaneously, throttling the amount of work allocated to each station at any given time based on the history of work delivery and processing times. Existing work allocators do not perform scheduling, and do not account for work co-arrival times to queues (e.g., where two pod-carrying robots arrive at a station at the same time).

In various examples, the scheduling systems and methods described herein provide a joint work allocation and scheduling alternative to the existing work allocators. Instead of emphasizing fastest deliveries to the station queues and throttling the amount of work allocated to each station, the queues' occupancy schedules are explicitly optimized, thereby exploiting-rather than being at the mercy of—the variance present in the work delivery and processing times. Its time complexity is pseudo-linear in the size of the planning time window. It should be noted that while the examples described herein focus on scheduling of robots in robotic warehouse environments (e.g., fulfillment centers), the approach is applicable to any environment with plannable and predictable resource transportation to queues.

While the existing work allocators cannot eliminate work gaps and queue overflow, leading to station underutilization, the first prototype of the various computer-implemented schedulers described herein eliminates both the work gaps (99%+ station utilization vs. 91-92% for the baseline) and queue overflow (at most 1 extra drive in the queue over target capacity vs. up to 7 for the baseline). Additionally, the computer-implemented schedulers provides new possibilities for robotic work replanning, and creates a language for the work allocation and the robotic drive movement to jointly optimize operation by negotiating and strategizing delayed deliveries.

Baseline Work Allocators

As used herein, a unit of work may be defined as an upstream planning system's request to the downstream work allocator to deliver a pod to a station, optionally by a deadline (referred to as the critical pull time or CPT). One work unit includes a fetch drive mission (e.g., a drive controlled to move from its initial location to the pod) and a carry drive mission (e.g., a drive controlled to lift the pod and carry it to the designated station's queue), with their durations referred to as fetch time and carry time, respectively. The sum of fetch time and carry time is the travel time. The time it takes a work unit (e.g., a pod being picked from) to be processed at the station is the dwell time, and is both work unit- and station-specific (e.g., as picking performance by robotic picking systems or human pickers may vary). Finally, the queueing time is the time a work unit spends queueing in a queue of robotic drives at the station prior to its processing. Queueing time cannot be determined exactly in advance and depends on the drive's arrival time and the state of the queue. All these times come with uncertainty; the least certain is the travel time due to the varying drive traffic conditions on robotic floors, though that uncertainty amount shrinks as the drive progresses towards its destination.

Figure 2:
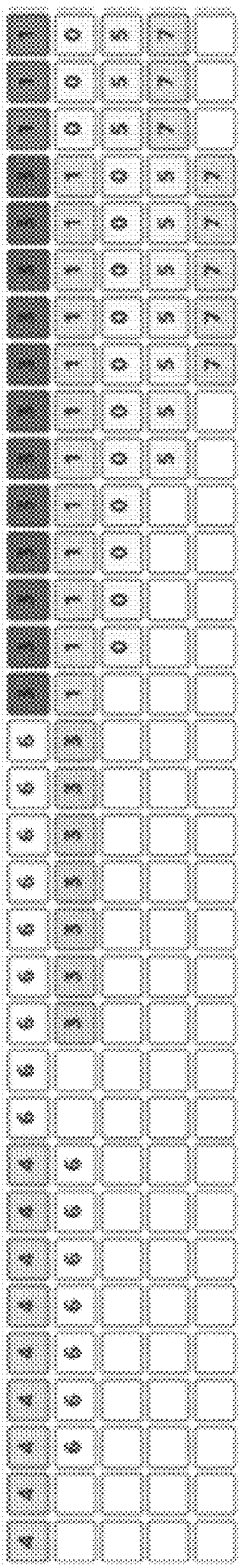
FIG. 2 depicts an example of a queue occupancy table that can be used to control robot drives, in accordance with various aspects of the present disclosure.

Given the stations' work pools composed by the upstream planning system and the state of the already allocated work, the task of a work allocator is to decide which drive robot will execute which work unit and when the drive robot should dispatch. While pods and stations are pre-matched upstream, a work allocator determines the work execution order, impacting CPT adherence, as well as the number of drives queueing at any given time, as reflected in the queue occupancy schedule. A queue (occupancy) schedule is a set of work units allocated to that queue's station, each having an assigned drive and its dispatch time or, alternatively, its expected arrival time to the queue (existing work allocators assume immediate drive dispatch). Occupancy (available occupancy), in this context, refers to robot occupancy of the particular station. Each schedule has a tabular form—table data (e.g., a queue occupancy table)—w.r.t. a chosen time scale, illustrated in FIG. 2. Its columns correspond to virtual times, its rows correspond to the queuing positions in the queue (top row is queue head nearest to the work station), and entries are work units for the occupied queue positions or empty. The work units at the top row are being processed; others are waiting. The time complexity of generating an occupancy table is linear in the chosen time scale length or the number of scheduled work units (a set of schedule entries, each having its queue entry time and dwell time), whichever is larger (usually, the former). The queue schedule quality is assessed by how much its fill with work deviates from the target queue capacity over time.

The quality of any work allocator is determined by the quality of the queue occupancy schedules it produces (work gaps, queue overflow) as well as its CPT adherence (in some examples described herein, CPT adherence may be measured through work age—the time since work appearance in its work pool and its allocation (defined as the time when the robotic drive dispatches to the station).

A conventional work allocator has two logical components. One is responsible for allocating enough work to keep stations busy. Another is a throttling component alleviating overallocation and queue overflow. Two work allocators are described herein (for purposes of providing a baseline level of performance): the work limit-based allocator (WLA) which may be limited to ensuring station business, and the Flow Assessor (FA), which may add work throttling to WLA.

WLA: The work limit-based allocator sends work to a station up to the fixed limit, defined as the target maximum for either the number of work units allocated to a station or their total dwell time ("max work"). While bounding the joint dwell/processing time of the work allocated to a station helps reduce work gaps, WLA has very little control over queue overflow, so WLA's initially smaller work gaps are often followed by significant queue overflow, translating into drive congestion, leading to work gaps.

FA: The lack of queue overflow control mechanism of WLA is addressed by throttling mechanisms. For example, FA throttles the target number of drives to maintain allocated to a station in order to not cause queue overflow (assuming that more than enough work had been allocated by WLA and is available for pruning), defining it for station i as $$D_i = kA_i/K_i$$

where $k>1$ is a constant, and $A_i$ and $K_i$ are the recent historical mean work unit travel time to and dwell time at station i. Under constant travel and dwell times, $A_i/K_i$ would be a perfect number of allocated drives, and no drive queues would be needed. Since these times vary in reality, FA over-allocates, bundling all the time variance effects into a single constant k. The latter should be sufficiently large to keep the station busy, and sufficiently small to avoid queue overflow. FA truncates WLA's allocated work list, alleviating queue overflow issue while paying for it in the emerging work gaps. Often, this over-allocation and truncation strategy of FA (running on top of WLA) works better in practice than the unthrottled WLA with a lowered work limit.

It may be hypothesized that, in general, a perfect choice of k eliminating both work gaps and queue overflow does not exist. WLA and FA do not reason explicitly about work co-arrival into station queue schedules, being at the mercy of time variance, and cannot reduce work gaps and queue overflow beyond a certain inherent limit (which would be true even in the presence of perfect travel and dwell time estimators for FA).

FIG. 1 is a scaled-down diagram of an example of a robot-controlled storage field and pick stations 100, according to various aspects of the present disclosure. In the example robot-controlled storage field and pick stations 100, a storage field 30 comprises pods/containers 22 and drive robots 24. Drive robots 24 may be configured to navigate the storage field 30 to locate specified pods/containers and may move the pod/container to a specific pick station. As shown, the pick stations may be located along the perimeter of the storage field 30 (e.g., for safety) although, other implementations and/or floor plans may be used, as desired. As shown in image 32, the drive robot 24, in some examples, may drive under the pod/container 22 and may lift the pod/container and navigate to the appropriate pick station. A human and/or another robot at the pick station may locate the relevant item or items from the pod/container 22 (e.g., according to an item order list) and may remove those items for further processing.

During surge periods, there may be a backlog of item orders (e.g., received by a controller device). The controller device may send executable control instructions to the drive robots 24 to select pods/containers 22 that include the items and may control the drive robots 24 to transport the pods/containers 22 to a pick station. As previously described, the scheduling systems described herein may control the arrival times of the drive robots 24 and the queuing time of the robots to optimize allocation of work to the stations.

Joint Allocation and Scheduling of Drive Robots

In this section, example approaches to work allocation are described, starting with a few preliminaries. Once work is allocated, control instructions may be sent to the drive robots 24 to control operations of the robots according to the determined allocation.

While eventually the robotic systems operate on a real time scale, described herein is a discrete relative time scale in virtual time (one unit of which is denoted as a vsec), defined by its base time (the real time matching zero virtual time), resolution, and length (e.g., the size of the planning window). For simplicity, the current disclosure uses 1 sec time scale resolution; dropping time scale notation when possible.

Physical drive queues (e.g., queues of drive robots 24) are represented as abstract single-server queues. Some robotic floor designs have 2-3 drive queues physically merging near the station, but such multi-entry physical queues can be represented as a single abstract queue, as the order of drive presentation to the station is not essential (and where it is essential, separate physical queues are used). A station operates with a certain takt (usually defined as a distribution) that varies across stations, making work dwell time estimates station-specific. The queue itself is characterized by its target capacity. In a perfect scenario, queue population is exactly at the target capacity at all times.

Joint Allocation and Scheduling Via Steady-State Planning at the Queue

A goal is to design a scheduler-a work allocator that, unlike its conventional analogs, would optimize robotic drive co-arrival to the station queues. As general scheduling is algorithmically hard, the various examples described herein focus on a tractable discrete-time scheduling heuristic that outperforms other robotic queuing controllers. The approach is first described in the context of work scheduling to a single station's queue. The approach is then generalized to the multi-station case.

Single-Queue Scheduling

Initially, the approach to single-station scheduling is informally described, relegating the formal algorithms to the later part of the section. A station queue schedule (e.g., its queue occupancy table) is presented in FIG. 3A. In the example, there are two drive robots currently present in the queue: drive robot 0 is processed for 4 vsec, while drive robot 1 is waiting before being processed for 6 vsec. The allocated drives that are still en route to the queue would have been layered over the already queueing and processing (and some processed) work; these drives are not displayed for clarity of presentation. This station's work pool has four drive robot work units available for allocation (e.g., drive robots 2, 3, 4, and 5), with the dwell times of 5, 3, 4, and 1 vsec, respectively.

Figure 3A:
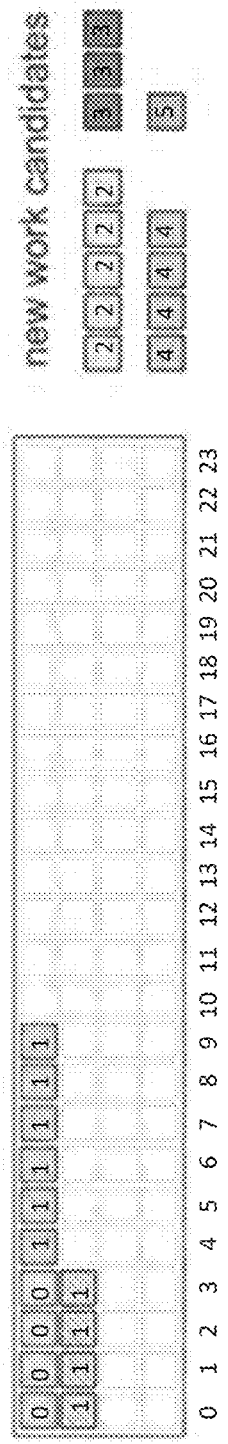
FIG. 3A depicts an example of a queue occupancy table including already allocated units and to be allocated units, in accordance with various examples of the present disclosure.
Figures 3B, 3C, 3D:
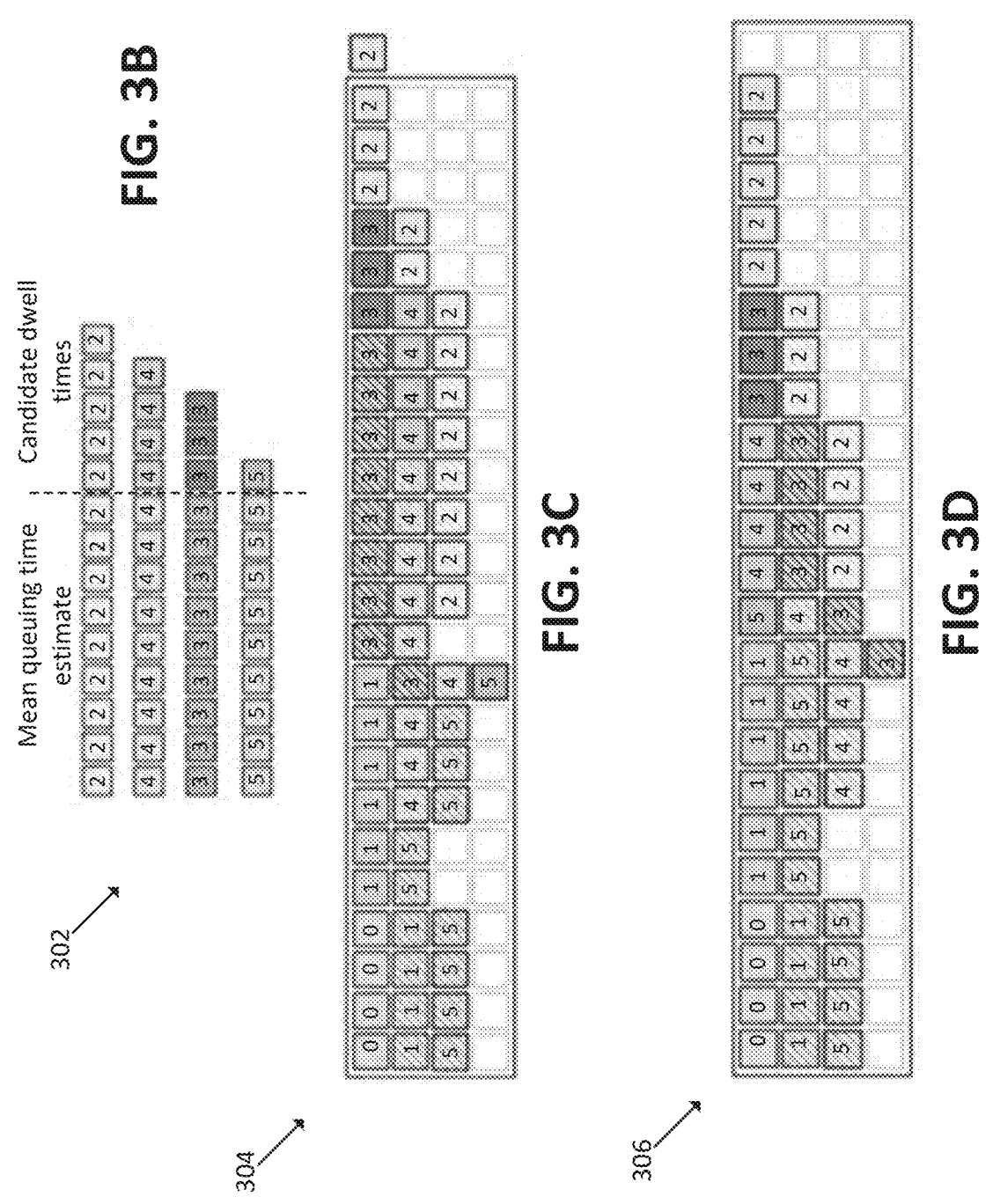

Assuming each of these work units could be dispatched to the queue at any moment, the question may be what would be the best entry times for the new work units into this schedule? Intuitively, new work should be added where the schedule has enough "space" for that extra work. This intuition has a geometric packing flavor: if the schedule table (e.g., the queue occupancy table) was a container, with the opening at the bottom, we could have "packed" the candidate work blocks—the size of which reflects the corresponding work units' dwell times into that container pre-filled with already allocated work, aiming at uniformly filling top rows (reducing work gaps) and avoiding container overflow (queue overflow). Queue overflow, in this context, refers to a limit or threshold on the number of drive robots that are allowed to queue at a given station at any given time (to avoid congestion, work gaps, and/or system lock up). However, a work unit often arrives to a non-empty queue and, first, spends some time queueing. Thus, the space the work unit will actually occupy in the schedule table is the sum of that work unit's queueing and dwell (virtual) times. While the dwell time can be estimated in advance, the queueing time cannot, being dependent on the arrival time and queue state. Despite this having arrived at what seems circular reasoning (queueing times are needed to compose the schedule, yet the schedule is needed to determine queueing times), the key observation—illustrated in FIGS. 3A-3D—allowing the recursion to be broken is that, if a close approximation of the queueing time is used for each work unit, then the amount of space the new work will occupy in the realized schedule's table under the new work entry times selected through geometric work packing will be similar to the amount of space the new work occupies in the packing. The queueing time best guess-which may be deviated from in different risk tolerance regimes—is the mean queueing time (the same for each considered new work unit), initially set as the theoretical expected mean under the expected steady-state queue load, and later replaced with an empirical estimate based on the established steady state of the queue. This scheduling approach is referred to as the steady-state planning at the queue. As shown in augmented candidate work 302 (FIG. 3B) candidate dwell times are augmented by adding the mean estimated queuing time for the particular work station to determine an estimated total time associated with a robot queuing at the station and being processed at the station. In FIG. 3C (queue occupancy table 304), the augmented candidate work 302 is packed into the queue occupancy table 304. The packing is not a valid schedule table; however, the packing provides drive robot entry times. FIG. 3D (queue occupancy table 306), represents a realized schedule (with realized queuing time) based on the packing from FIG. 3C's drive robot entry times.

The scheduled work queueing times often deviate from the used mean queueing time estimate. When an overshoot occurs, the work unit may be placed in an "emptier space" in the schedule table, delaying its arrival and, in extreme cases, potentially not meeting CPT. When an undershoot occurs, there is a chance too many drive robot arrivals may be scheduled at a given time, potentially leading to queue overflow. Overshooting may be addressed via replanning as described in further detail below. Undershooting may be addressed by controlling queue overflow by re-allocating the newly allocated work that is causing the overflow.

The computer-implemented scheduler may be formalized as Algorithm 1 depicted in FIG. 4. The first half of the algorithm (lines 1-12) adds new work to the schedule, and the second half (lines 13-22) identifies the time slots where the schedule is overflowing and "unallocates" a minimal number of the new work units causing that overflow. Overflow slots stemming not from new work placement, but from time uncertainty realization in the work already committed to may be dealt with via replanning. Note that Algorithm 1 depicted in FIG. 4 is merely one example implementation of the robot queue arrival scheduler described herein. Algorithm 1 implies placement of one work unit (e.g., robot carrying a pod) at a time (and finding the best queue entry time for it). However, more generally, the robot queue arrival scheduler may include packing multiple candidate work units geometrically. The queue entry times from the packing may be used to schedule arrival of these multiple work units at the appropriate queue. Generally, any geometric packing heuristic may be used to pack as many work units as desired (simultaneously, or not), aiming at packing work under target queue capacity.

The more work units that are packed simultaneously, the higher the likelihood of accidentally causing queue overflow during scheduling, resulting in some work un-allocation (as described below). Thus, the Algorithm 1 (and other similar approaches) may pack a single work unit at a time, and may use the best entry time selection heuristic based on finding the least bottlenecked (w.r.t., residual queue capacity) slot in the schedule, tie-breaking preferring earlier entry).

The allocated work trail (line 3 of FIG. 4) is the set of recently executed work units, affecting queueing times, processing start times, and completion times of the still queueing and processed work units. A work unit finished processing at time t is added to the trail if the queue is not empty at the time, and leaves the trail when the job that was at the queue's tail at time t finishes processing (if the robotic system does not allow to track drive queue entry times, a short fixed time window trail is used). The fixed time window trail may be used to reconcile inconsistencies in the queue arrival and processing start/end times of work units-some of which have some of these times already realized, while others only have imprecise estimates. Candidate work is retrieved from W prioritizing by CPT or work age (the time since the work unit appeared in the work pool).

Best entry time selection (line 9) is performed by finding the least bottlenecked slot for work placement in a series of schedule table residual capacities—the remaining capacities under the target for each virtual time—tie-breaking by favoring earlier entries. The algorithm solves a sliding window minimum—with the window size equal to the expected space the work will occupy—over a series of residual capacities, doing so using a dynamic programming-based approach whose runtime is linear in the planning window size and is asymptotically independent of the number of candidate entry times considered.

Finally, Algorithm 1 assumes existence of candidate arrival times $A_i$ (or, alternatively, drives and their fetch and dispatch times). These may be defined based on a small number of available drives (as few as a single robotic drive), provided by a pre-run of a drive allocator balancing drives over stations. However, under scheduling, the fastest fetch time is not relied on, and even a simple greedy drive allocator—where stations take turns bidding on drives for the pods in demand-will work well. In various example implementations of the scheduler, it may be assumed that each work unit from the pool comes with a small number of candidate drives with suboptimal yet reasonable fetch times. In various examples, the scheduler may select the shortest out of the offered fetch times and adds a suitable delay to it. Despite the difference in the number of considered entry times, both versions have the same time complexity due to find-best-entry-virtual-time's asymptotic independence of the number of evaluated entry times.

The time complexity of Algorithm 1 is $O(\ell\,(|W|+|O|))$, where $\ell$ is the planning time window size in virtual time units (e.g., 300 vsec), $|W|$ is the number of the work units considered for allocation (e.g., 30), and $|O|$ is maximal number of overflow slots in the schedule (theoretically, in an adversarially composed schedule, may be as bad as $\ell$, but in practice is a small constant; driving it to 0 would require replanning (described below). Thus, it is pseudo-linear in the planning time window size.

Figure 3E:
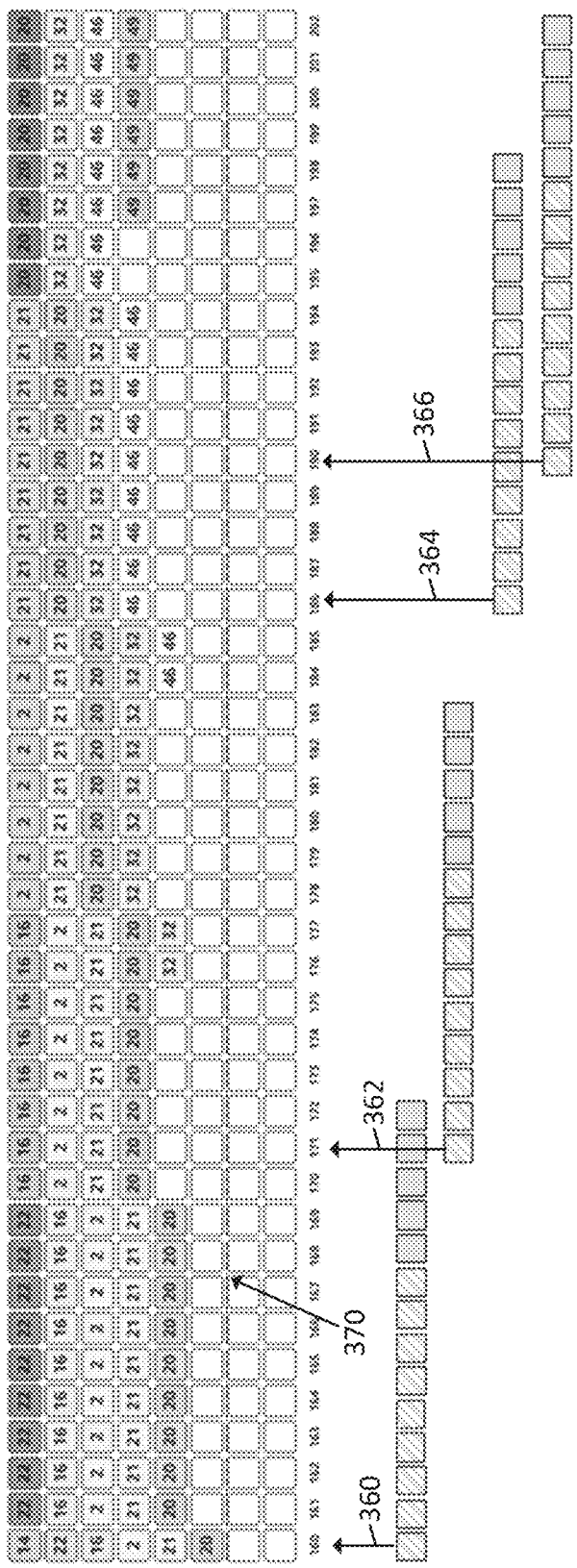
FIG. 3E depicts a greedy scheduling packing example for a queue occupancy table, in accordance with various aspects of the present disclosure.

FIG. 3E depicts a greedy scheduling packing example for a queue occupancy table, in accordance with various aspects of the present disclosure. In the packing example shown in FIG. 3E, four candidate arrival times are shown (e.g., arrival times 360, 362, 364, and 366) for a given work item (e.g., for a drive robot allocated to the station). The station represented by the queue occupancy table in FIG. 3E may have a threshold capacity of six drive robots (represented by threshold line 370 in the queue occupancy table). Arrival of a drive robot at arrival time 360 results in the station being over capacity (as seven drive robots will be at the station if the drive robot being allocated arrives at arrival time 360). Arrival of a drive robot at arrival time 362 results in 1 unit of residual capacity, while arrival of drive robots at arrival times 364 and 366 result in 2 units of residual capacity. The algorithm in FIG. 4 may select the arrival time with the greatest residual capacity. However, as arrival times 364 and 366 are tied in terms of residual capacity, the (estimated) earliest arrival time may be used as a tie-breaker. It should be noted that although four example candidate arrival times are evaluated in the example of FIG. 3E, the algorithm shown in FIG. 4 may evaluate all arrival times in the queue occupancy table starting with the earliest candidate arrival time (e.g., the earliest time at which the robot drive may arrive at the station according to its fetch and carry times).

As previously described, if newly-allocated work causes a schedule overflow (e.g., more than six drive robots allocated to the work station at a given unit of time in the example in FIG. 3E), the overflow time slots in the queue occupancy table may be identified, and a minimal number of newly allocated work may be de-allocated to eliminate local overflow (one time slot at a time). Un-allocated candidates may be iterated over starting with later times and, for each time, from the work positioned closer to the tail of the queue.

Multi-Queue Generalization and Competition for Shared Resources

In FIGS. 3A-3E example operations of a single-station scheduler are shown and described. Given candidate work, each having a number of potential arrival times into the queue schedule, the scheduler fits that work into the schedule controlling both work gap and queue overflow.

While the assumption about having some—reasonable yet potentially far from the fastest—candidate arrival times would not work well for conventional work allocators dependent upon the fastest fetch, a scheduler (e.g., drive robot scheduler 150), having no such dependency, can work with far-from-fastest fetch times because the "front end" (earlier times) of the queue's schedule is maintained in a well-packed state, and the newly allocated work is often added to the "rear end" (later times) of the schedule. Even when provided an early entry time option, the scheduler is likely to still add an extra delay on top of the corresponding fetch time to schedule the work for the arrival at a later (virtual) time better fitting the schedule.

Thus, drive robot allocation (or, alternatively, selection of candidate schedule entry times for each allocated pod) is not a major problem for a scheduler, and candidate drive selection may be performed using a fast greedy approach providing longer fetch times, such as the one where stations take turns in bidding on the drives for their pods in immediate demand. However, there still may be a benefit of finding shortest fetch times and balancing of good fetch times (drives at short distances from the pods) between stations—the earlier the earliest candidate arrival time into the schedule is, the more candidate entry times (assuming all the extra delays within the planning window scope) will be considered and the less likely it is that the work will not be allocated due to the lack of a suitable entry and will age excessively in the work pool. Such shorter fetch times may be obtained by using the existing min-cost network flow-based drive-pod matcher, where the drive-pod match costs will be proportional to drive-pod fetch times. This, however, would require both the drive-pod allocator and the stations schedulers to sequentially execute within the allotted work allocation round time budget (e.g., ~3 sec).

Replanning

In the discussion of Algorithm 1 (FIG. 4), it is mentioned that the schedule gets perturbed by the gradually realized uncertainty in work travel, queueing, and dwell times, and the example implementation of the drive robot scheduler 150 ignores queue overflow stemming from it (dealing only with the queue overflow resulting from the unsuccessful new work placement to the schedule). The only way to treat queue overflow caused by the work that has already been committed to and provide a strict no-queue-overflow guarantee is via work replanning. If a work unit is still at the stage of its drive waiting for delayed dispatch, such a work unit's arrival can be easily moved within the schedule at no cost (assuming that there is no attempt to postpone urgent work). If a work unit's drive robot is currently executing its fetch mission, it is also easy to add an extra delay to that mission by cancelling that fetch mission and setting up a new one with a suitable delay, or forcing a drive to pass through a "rally point", suitably postponing the drive's arrival. Replanning the work that is already in the carry phase is possible, but would incur a potentially higher cost due to the extension of the time the pod will be unavailable to other stations and the need to find a storage space to store the pod for a suitable duration of time to accommodate the requested pod delivery delay extension.

Figure 5:
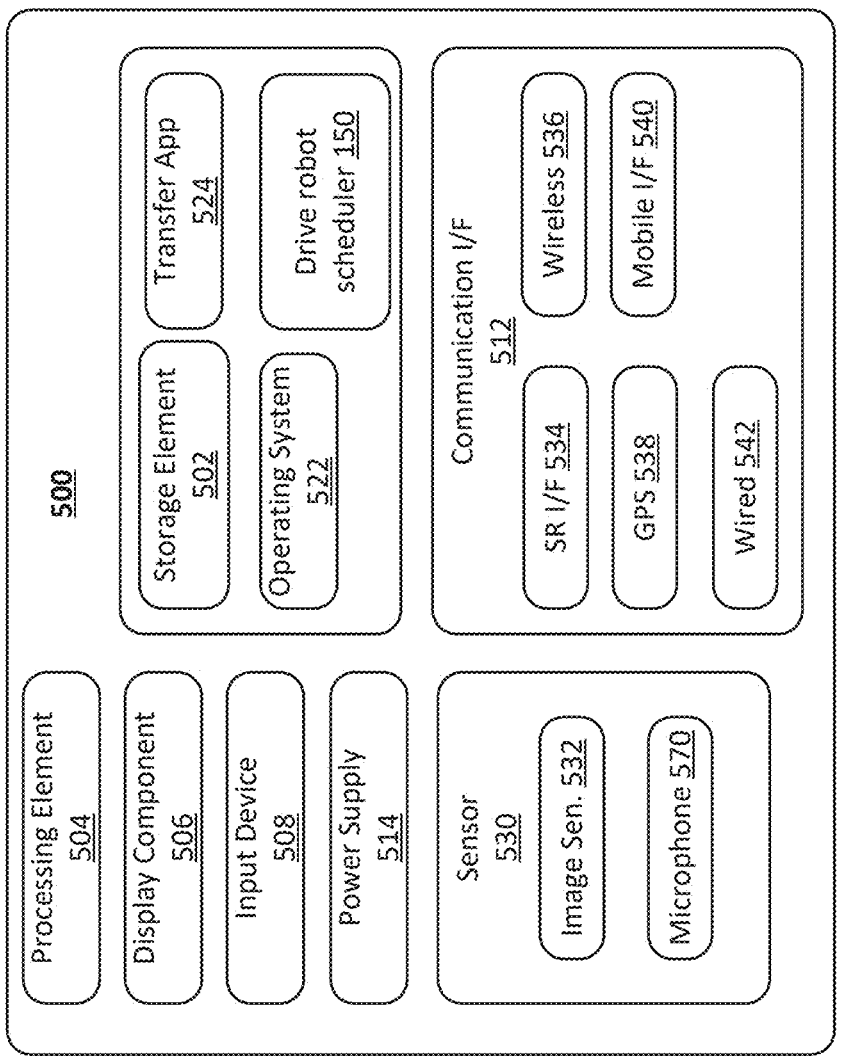
FIG. 5 is an example computing device architecture that may be used in accordance with various techniques described herein.

FIG. 5 is a block diagram showing an example architecture 500 of a computing device that may be used in accordance with various aspects of the present disclosure. For example, the drive robot scheduler 150 may comprise one or more components of the architecture 500 (or the architecture 500 may include the drive robot scheduler 150, as shown). It will be appreciated that not all devices will include all of the components of the architecture 500 and some user devices may include additional components not shown in the architecture 500. The architecture 500 may include one or more processing elements 504 for executing instructions and retrieving data stored in a storage element 502. The processing element 504 may comprise at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. For example, the storage element 502 may comprise flash memory, random-access memory, disk-based storage, etc. Different portions of the storage element 502, for example, may be used for program instructions for execution by the processing element 504, storage of images or other digital works, and/or a removable storage for transferring data to other devices, etc. Additionally, storage element 502 may store computer-executable instructions configured to implement the drive robot scheduler 150 described herein.

The storage element 502 may also store software for execution by the processing element 504. An operating system 522 may provide the user with an interface for operating the computing device and may facilitate communications and commands between applications executing on the architecture 500 and various hardware thereof. A transfer application 524 may be configured to receive images, audio, and/or video from another device (e.g., a mobile device, image capture device, and/or display device) or from an image sensor 532 and/or microphone 570 included in the architecture 500.

When implemented in some user devices, the architecture 500 may also comprise a display component 506. The display component 506 may comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images generated in accordance with the various techniques described herein. In various examples, the display component 506 may be a wearable display (e.g., in a headset, goggles, and/or glasses) that may display the various graphical highlight data, graphical navigational hints, text, other graphical data, etc., described herein. In some examples, the architecture 500 may include one or more speakers effective to output audio.

The architecture 500 may also include one or more input devices 508 operable to receive inputs from a user. The input devices 508 can include, for example, a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

The communication interface 512 may comprise one or more wired or wireless components operable to communicate with one or more other computing devices. For example, the communication interface 512 may comprise a wireless communication module 536 configured to communicate on a network, according to any suitable wireless protocol, such as IEEE 802.11 or another suitable wireless local area network (WLAN) protocol. A short range interface 534 may be configured to communicate using one or more short range wireless protocols such as, for example, near field communications (NFC), Bluetooth, Bluetooth LE, etc. A mobile interface 540 may be configured to communicate utilizing a cellular or other mobile protocol. A Global Positioning System (GPS) interface 538 may be in communication with one or more earth-orbiting satellites or other suitable position-determining systems to identify a position of the architecture 500. A wired communication module 542 may be configured to communicate according to the USB protocol or any other suitable protocol.

The architecture 500 may also include one or more sensors 530 such as, for example, one or more position sensors, image sensors, and/or motion sensors. An image sensor 532 is shown in FIG. 5. Some examples of the architecture 500 may include multiple image sensors 532. For example, a panoramic camera system may comprise multiple image sensors 532 resulting in multiple images and/or video frames that may be stitched and may be blended to form a seamless panoramic output. An example of an image sensor 532 may be a camera configured to capture color information, image geometry information, and/or ambient light information. In various examples, the image sensor 532 may be effective to capture image and/or video frames that may be used to detect the various objects in the physical environment of the user.

As noted above, multiple devices may be employed in a single system. In such a multi-device system, each of the devices may include different components for performing different aspects of the system's processing. The multiple devices may include overlapping components. The components of the various computing device(s), as described herein, are exemplary, and may be located as a stand-alone device or may be included, in whole or in part, as a component of a larger device or system.

Figure 6:
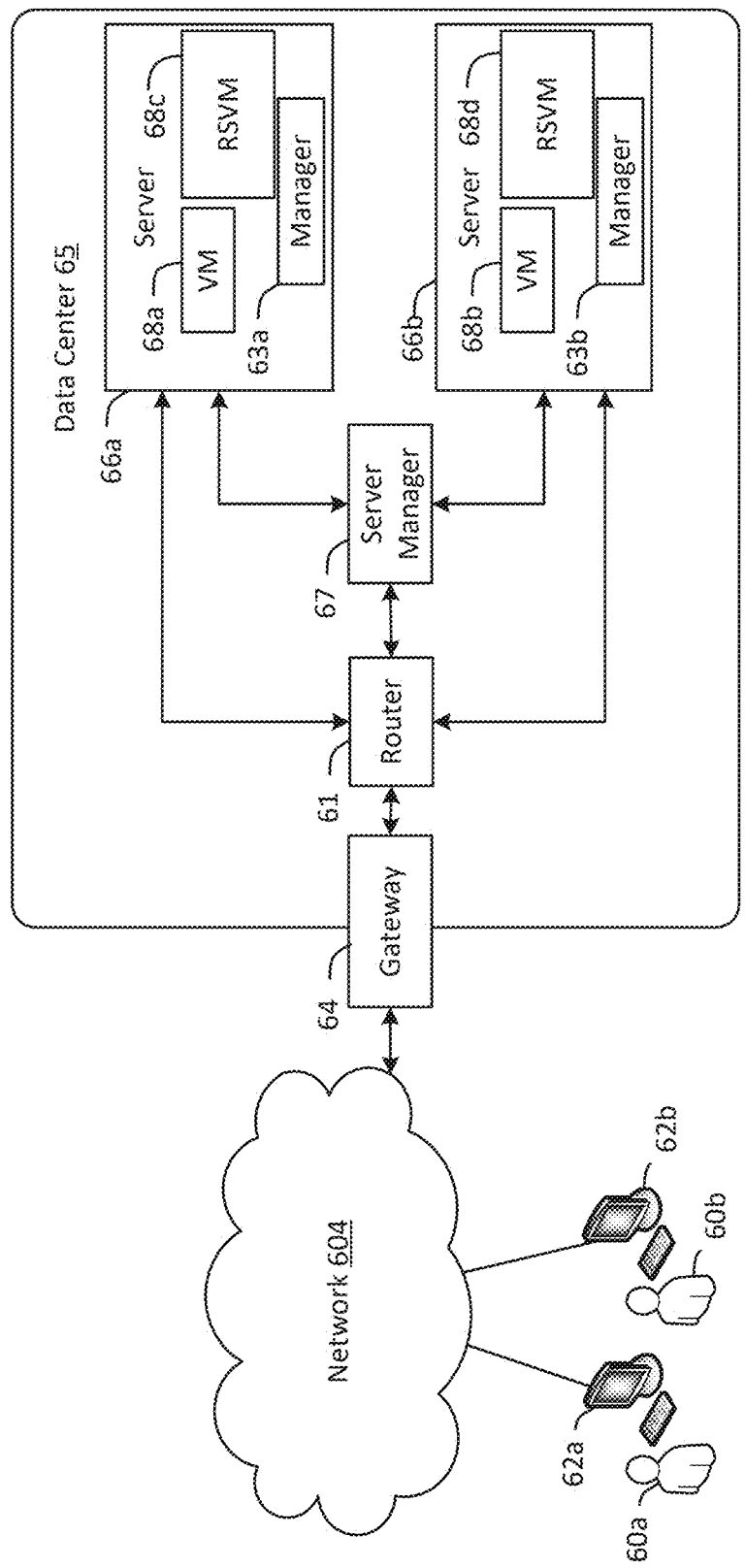
FIG. 6 is a diagram illustrating an example system for sending and providing data that may be used in accordance with the present disclosure.

An example system for sending and providing data that may be used to perform one or more of the various techniques described herein will now be described in detail. In particular, FIG. 6 illustrates an example computing environment in which the embodiments described herein may be implemented. For example, the computing environment of FIG. 6 may be configured to dynamically allocate robotic resources as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via a computer communication network 604. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services, and the like. In various examples, the instances may be configured to execute one or more of the various image processing techniques described herein.

These services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices, and the like.

Each type or configuration of computing resource may be available in different sizes, such as large resources—consisting of many processors, large amounts of memory and/or large storage capacity—and small resources—consisting of fewer processors, smaller amounts of memory, and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 604 may, for example, be a publicly accessible network of linked networks and possibly operated by various distinct parties, such as the Internet. In other embodiments, network 604 may be a private network, such as a corporate or university network that is wholly or partially inaccessible to non-privileged users. In still other embodiments, network 604 may include one or more private networks with access to and/or from the Internet.

Network 604 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box, or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 604. Router 61 may be connected to one or more load balancers, and may, alone or in combination, manage communications within networks in data center 65, for example, by forwarding packets or other data communications as appropriate based on characteristics of such communications (e.g., header information including source and/or destination addresses, protocol identifiers, size, processing requirements, etc.), and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location, or other attributes associated with user computers 62, a nature of a task with which the communications are associated, a priority of a task with which the communications are associated, a duration of a task with which the communications are associated, a size and/or estimated resource usage of a task with which the communications are associated, and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, configured to implement and distribute the infrastructure, and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example, computer servers, storage devices, network devices, and the like. In some embodiments, a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments, the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Figure 7:
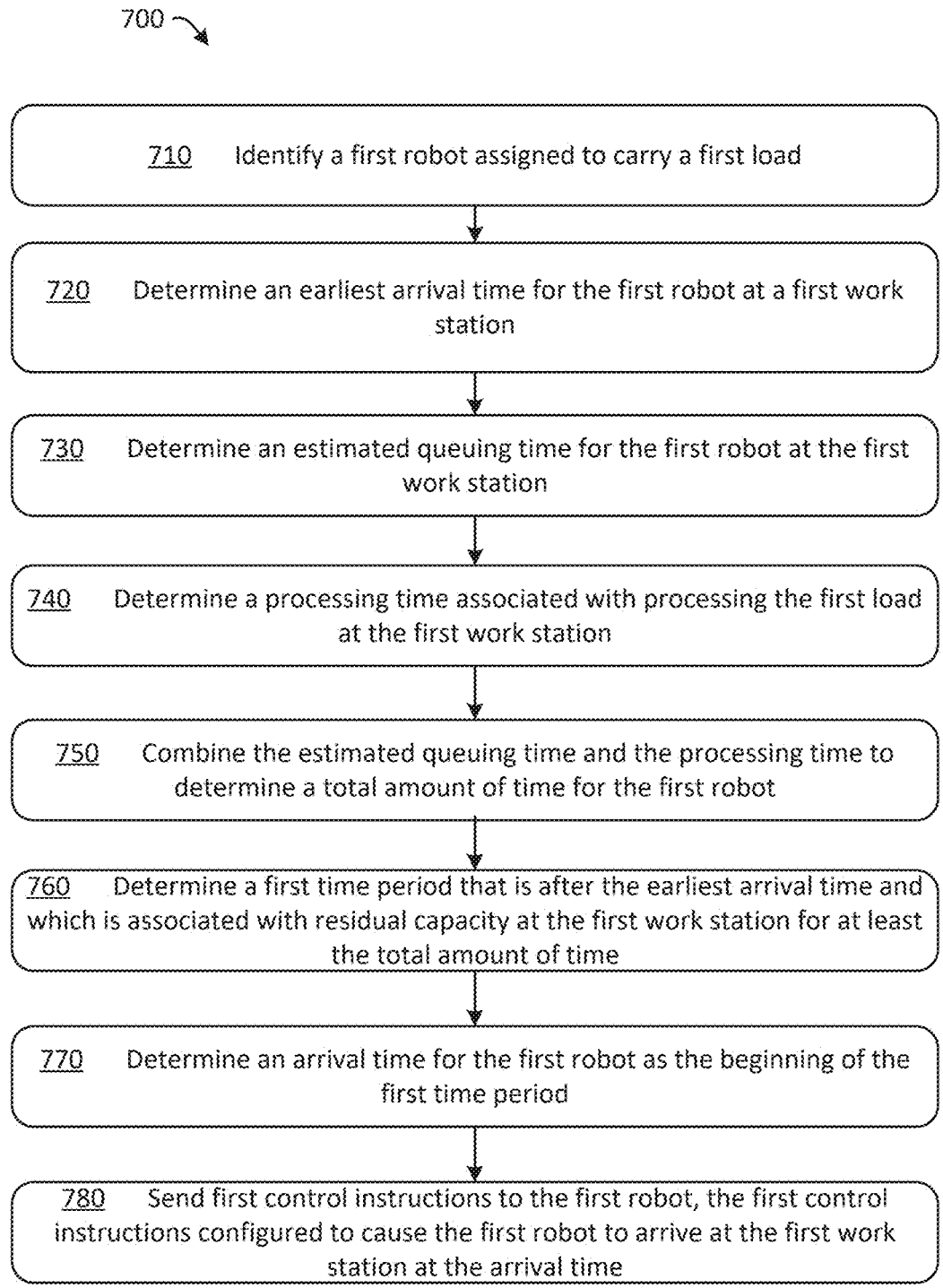
FIG. 7 is a flowchart describing an example process for scheduling arrival of robotic resources at a work station, according to various aspects of the present disclosure.

FIG. 7 is a flowchart describing an example process 700 for scheduling arrival of robotic resources at a work station, according to various aspects of the present disclosure. Those portions of FIG. 7 that have been previously discussed in reference to FIGS. 1-6 may not be described again for purposes of clarity and brevity. The actions of the process 700 may represent a series of instructions comprising computer-readable machine code executable by one or more processing units of one or more computing devices. In various examples, the computer-readable machine codes may be comprised of instructions selected from a native instruction set of and/or an operating system (or systems) of the one or more computing devices. Although the figures and discussion illustrate certain operational steps of the system in a particular order, the steps described may be performed in a different order (as well as certain steps removed or added) without departing from the intent of the disclosure.

Process 700 may begin at action 710, at which a first robot assigned to carry a first load may be identified. For example, an upstream planning system may request to a downstream work allocator to deliver a pod to a station and a particular drive robot may be selected to fetch and carry the pod to the station. Processing may continue at action 720, at which an earliest arrival time for the first robot at the first work station may be determined. The earliest arrival time may be determined based on the current positions of the assigned drive robot and the pod, as well as potentially on current traffic conditions and/or order volume.

Processing may continue at action 730, at which an estimated queuing time for the first robot at the first work station may be determined. The estimated queuing time may be, for example, the mean queuing time for drive robots at the work station over a given time period. In some examples, the mean queuing time may be set as the theoretical expected mean under the expected steady state queue load. In other cases, the estimated queuing time may be an empirical estimate based on the established steady state of the queue over time.

Processing may continue at action 740, at which a processing time associated with processing the first load at the first work station may be determined. The processing time may be the dwell time for the pod, which may be known in advance based on the station performance and/or number of items/packages to be picked from the pod. Processing may continue at action 750, at which the estimated queuing time and the processing time may be combined to determine a total amount of time for the first robot. For example, the augmented candidate work 302 candidate dwell times shown in FIG. 3B may be examples of combining the estimated queuing time and the dwell times to determine the total amount of time for the first robot (e.g., a drive robot 24).

Processing may continue at action 760, at which a first time period that is after the earliest arrival time and which is associated with residual capacity at the first work station for at least the total amount of time is determined. For example, as shown in FIG. 3E, different candidate arrival times may be considered. At each time, the residual capacity may be checked to ensure that the station has capacity for the drive robot for at least the total amount of time (e.g., the time spent queuing and the time while the pod is being processed). If at any time the number of robots allocated to the station exceeds the threshold, the station may be deemed not to have residual capacity for that arrival time. As previously described, the arrival time with the highest residual capacity may be selected as the arrival time with ties in residual capacity being resolved in favor of the earliest arrival time.

Processing may continue at action 770, at which the arrival time (e.g., a target arrival time) may be determined for the first robot as the beginning of the first time period. In other words, the first column of the queue occupancy table that corresponds to the arrival time for the first robot may be selected. Processing may continue at action 780, at which first control instructions may be sent to the first robot. For example, the scheduler may first determine optimal arrival times for a number of robotic drives/pods, in a batch. Periodically, the scheduler may determine whether the time has come to dispatch one or more of the robotic drives on their missions to fetch pods and enqueue the pods in the workstation queue. If the time has come, the scheduler may send corresponding drive activity scheduling requests to a drive movement coordinator. In various examples, the drive movement coordinator may, in turn, send the first control instructions to cause the first robot to deploy and to arrive at the first work station at the arrival time.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A method comprising:
   determining first data comprising a queue occupancy table for robot occupancy at a first work station, the queue occupancy table comprising a first plurality of rows and a first plurality of columns, wherein each row of the first plurality of rows represents a respective queue position of robots and each column of the first plurality of columns represents a respective time step;
   determining a first robot assigned to carry a first load;
   determining an estimated earliest arrival time for the first robot at the first work station;
   determining an estimated queuing time at the first work station;
   determining an estimated processing time associated with processing the first load at the first work station;
   determining a target arrival time for the first robot in the queue occupancy table by:
      combining the estimated queuing time and the processing time to determine a total time for the first robot;
      determining a first number of cells of the queue occupancy table associated with the total time;
      determining a first column in the queue occupancy table that is associated with a first time that is after the estimated earliest arrival time and which is associated with a second number of consecutive columns having unoccupied cells, wherein the second number is greater than or equal to the first number of cells; and
      determining the first time as the target arrival time for the first robot; and
   sending first control instructions to the first robot, the first control instructions configured to cause the first robot to arrive at the first work station at the first time.

2. The method of claim 1, further comprising:
   determining a second column in the queue occupancy table that is associated with a second time that is after the estimated earliest arrival time and which is associated with a third number of consecutive columns having unoccupied cells, wherein the third number is greater than or equal to the first number of cells; and
   selecting the first time as the arrival time for the first robot over the second time based on the first time being earlier than the second time.

3. The method of claim 1, further comprising, after sending first control instructions to the first robot:
   determining an updated queuing time for the first robot;
   determining an updated total time for the first robot; and
   determining an updated number of cells of the queue occupancy table associated with the first robot.

4. A method comprising:
   determining a first robot assigned to carry a first load;
   determining an estimated earliest arrival time for the first robot at a first work station;
   determining an estimated queuing time at the first work station;
   determining an estimated processing time associated with processing the first load at the first work station;
   determining an arrival time for the first robot by:
      combining the estimated queuing time and the estimated processing time to determine a total amount of time for the first robot;
      determining a first time period that is after the estimated earliest arrival time and which is associated with available occupancy at the first work station for at least the total amount of time; and
      determining the arrival time for the first robot as a beginning of the first time period; and
   sending first control instructions to the first robot, the first control instructions configured to cause the first robot to arrive at the first work station at the arrival time.

5. The method of claim 4, further comprising:
   determining a second time period that is after the estimated earliest arrival time and which is associated with available occupancy at the first work station for at least the total amount of time; and
   selecting the first time period over the second time period for the arrival time based at least in part on a first residual capacity of the first time period being greater than a second residual capacity for the second time period.

6. The method of claim 4, further comprising:
   determining a second time period that is after the estimated earliest arrival time and which is associated with available occupancy at the first work station for at least the total amount of time; and
   selecting the first time period over the second time period for the arrival time based at least in part on the beginning of the first time period being earlier than a beginning of the second time period.

7. The method of claim 6, wherein the first time period is selected over the second time period further based at least in part on a first residual capacity of the first time period being equal to a second residual capacity of the second time period.

8. The method of claim 4, further comprising:
   determining that an allocation of the first robot at the beginning of the first time period results in a schedule overflow in a queue occupancy table; and
   deallocating at least one robot arrival from the queue occupancy table based at least in part on the schedule overflow.

9. The method of claim 4, further comprising:
   determining the estimating queuing time for the first robot based on a mean queueing time for robots at the first work station;
   determining a realized queuing time different from the estimated queuing time for the first robot based at least in part on the arrival time for the first robot;
   determining an updated arrival time for the first robot by:
      combining the realized queuing time and the processing time to determine a second total amount of time for the first robot; and
      determining a second time period that is after the earliest arrival time and which is associated with available occupancy at the first work station for at least the second total amount of time; and
   sending updated control instructions to the first robot, the updated control instructions configured to cause the first robot to arrive at the first work station at the updated arrival time.

10. The method of claim 4, further comprising:
   determining respective arrival times for a plurality of robots, the plurality of robots comprising the first robot, wherein the respective arrival times are determined based at least in part on a queue occupancy table associated with the first work station.

11. The method of claim 10, wherein the queue occupancy table indicates respective occupancy of each of a plurality of queuing positions of robots at the first work station at a plurality of time steps.

12. The method of claim 4, further comprising:
determining the earliest arrival time for the first robot at the first work station based at least in part on a current position of the first robot, a current position of a first load assigned to be brought to the first work station by the first robot, and a current position of the first work station.

13. A system comprising:
at least one processor; and
non-transitory computer-readable memory storing instructions that, when executed by the at least one processor, are effective to:
determine a first robot assigned to carry a first load;
determine an estimated earliest arrival time for the first robot at a first work station;
determine an estimated queuing time at the first work station;
determine an estimated processing time associated with processing the first load at the first work station;
determine an arrival time for the first robot by:
combining the estimated queuing time and the estimated processing time to determine a total amount of time for the first robot;
determining a first time period that is after the estimated earliest arrival time and which is associated with available occupancy at the first work station for at least the total amount of time; and
determining the arrival time for the first robot as a beginning of the first time period; and
wherein the instructions, when executed by the at least one processor, are further effective to:
send first control instructions to the first robot, the first control instructions configured to cause the first robot to arrive at the first work station at the arrival time.

14. The system of claim 13, the non-transitory computer-readable memory storing further instructions that, when executed by the at least one processor, are further effective to:
determine a second time period that is after the estimated earliest arrival time and which is associated with available occupancy at the first work station for at least the total amount of time; and
select the first time period over the second time period for the arrival time based at least in part on a residual capacity of the first time period being greater than a residual capacity for the second time period.

15. The system of claim 13, the non-transitory computer-readable memory storing further instructions that, when executed by the at least one processor, are further effective to:
determine a second time period that is after the estimated earliest arrival time and which is associated with available occupancy at the first work station for at least the total amount of time; and
select the first time period over the second time period for the arrival time based at least in part on the beginning of the first time period being earlier than a beginning of the second time period.

16. The system of claim 15, wherein the first time period is selected over the second time period further based at least in part on a residual capacity of the first time period being equal to the residual capacity of the second time period.

17. The system of claim 13, the non-transitory computer-readable memory storing further instructions that, when executed by the at least one processor, are further effective to:
determine that an allocation of the first robot at the beginning of the first time period results in a schedule overflow in a queue occupancy table; and
deallocate at least one robot arrival from the queue occupancy table based at least in part on the schedule overflow.

18. The system of claim 13, the non-transitory computer-readable memory storing further instructions that, when executed by the at least one processor, are further effective to:
determine the estimated queuing time for the first robot based on a mean queueing time for robots at the first work station;
determine a realized queuing time different from the estimated queuing time for the first robot based at least in part on the arrival time for the first robot;
determine an updated arrival time for the first robot by:
combining the realized queuing time and the processing time to determine a second total amount of time for the first robot; and
determining a second time period that is after the estimated earliest arrival time and which is associated with available occupancy at the first work station for at least the second total amount of time; and
wherein the instructions, when executed by the at least one processor, are further effective to:
send updated control instructions to the first robot, the updated control instructions configured to cause the first robot to arrive at the first work station at the updated arrival time.

19. The system of claim 13, the non-transitory computer-readable memory storing further instructions that, when executed by the at least one processor, are further effective to:
determine respective arrival times for a plurality of robots, the plurality of robots comprising the first robot, wherein the respective arrival times are determined based at least in part on a queue occupancy table associated with the first work station.

20. The system of claim 19, wherein the queue occupancy table indicates respective occupancy of each of a plurality of queuing positions of robots at the first work station at a plurality of time steps.

* * * * *